United States Patent
Mohammadi et al.

(10) Patent No.: US 11,159,090 B2
(45) Date of Patent: Oct. 26, 2021

(54) SYNCHRONOUS RECTIFICATION OF LLC CONVERTERS BASED ON HOMOPOLARITY

(71) Applicants: ALPHA TECHNOLOGIES LTD., Burnaby (CA); THE UNIVERSITY OF BRITSH COLUMBIA, Vancouver (CA)

(72) Inventors: Mehdi Mohammadi, Vancouver (CA); Martin Ordonez, Vancouver (CA); Mohammad Mahdavi, Vancouver (CA); Peter Ksiazek, Burnaby (CA); Navid Shafiei, Burnaby (CA); Rahul Khandekar, Burnaby (CA)

(73) Assignees: ALPHA TECHNOLOGIES LTD., Burnaby, CA (US); The University of British Columbia, Vancouver (CA)

(*) Notice: Subject to any disclaimer, the term of this patent is extended or adjusted under 35 U.S.C. 154(b) by 0 days.

(21) Appl. No.: 16/887,727

(22) Filed: May 29, 2020

(65) Prior Publication Data
US 2020/0382012 A1 Dec. 3, 2020

(30) Foreign Application Priority Data
May 30, 2019 (CA) .................. CA 3044742

(51) Int. Cl.
*H02M 3/335* (2006.01)
*H02M 1/32* (2007.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 1/0058* (2021.05)

(58) Field of Classification Search
CPC .. H02M 3/335; H02M 3/33592; H02M 1/083; H02M 2001/0058; H02M 1/009; H02M 3/01; H02M 1/32; H02M 1/325; H02M 3/33507; H02M 3/33569; H02M 3/33576
See application file for complete search history.

(56) References Cited

U.S. PATENT DOCUMENTS

| | | | | |
|---|---|---|---|---|
| 8,064,229 B2* | 11/2011 | Stuler | ............... | H02M 3/33592 363/21.06 |
| 10,554,136 B1* | 2/2020 | Miletic | ............. | H02M 3/33515 |
| 2016/0087544 A1* | 3/2016 | Jin | ......................... | H02M 3/157 363/21.02 |
| 2020/0195124 A1* | 6/2020 | Mayell | .................. | H02M 3/156 |

* cited by examiner

*Primary Examiner* — Gary L Laxton
(74) *Attorney, Agent, or Firm* — Volpe Koenig (57) ABSTRACT

Synchronous rectification methods and algorithms, and polarity sensing techniques, based on the homopolarity cycle concept for conduction loss reduction in LLC resonant converters are provided. In a half bridge rectifier configuration, one of rectifier switches is switched ON when the polarity of the inverter and rectifier voltages are both positive and the other rectifier switch is switched ON when both polarities are negative.

21 Claims, 5 Drawing Sheets

SYNCHRONOUS RECTIFICATION OF LLC CONVERTERS BASED ON HOMOPOLARITY

CROSS REFERENCE TO RELATED APPLICATIONS

This application claims the benefit of priority from Canadian Patent Application No. 3,044,742 filed May 30, 2019, which is/are incorporated by reference as if fully set forth.

FIELD OF THE INVENTION

This invention relates to high efficiency DC/DC power conversion and specifically to the synchronous rectification of LLC resonant converters.

BACKGROUND OF THE INVENTION

Figure 1:
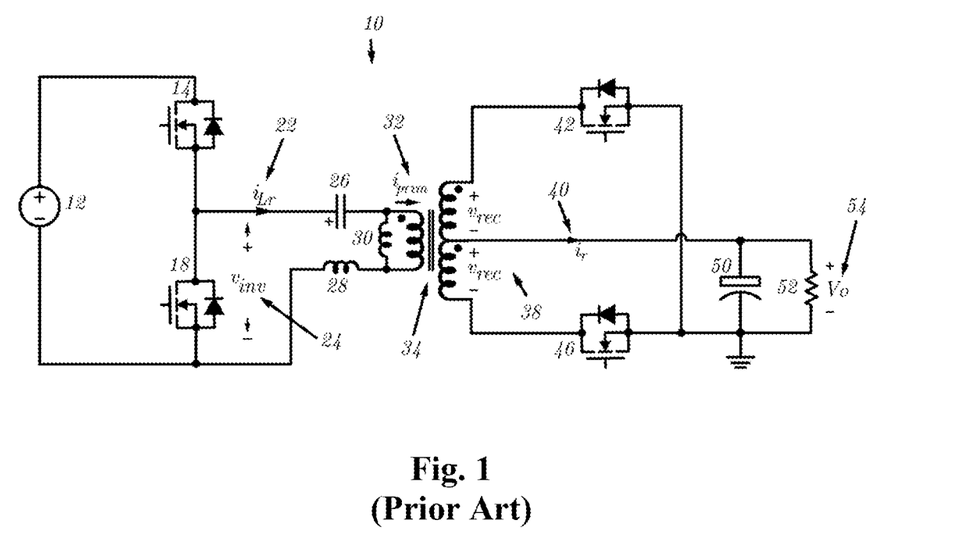
FIG. 1 is a circuit diagram of the topology of a typical prior art half bridge LLC converter with center tap rectifier.

As the use of power electronic converters and demands for high-efficiency converters have grown, it is increasingly important to take into consideration efficiency and power density when designing a converter. In the past decade, resonant power converters received considerable attention due to their ability to provide soft switching conditions, reduce switching losses, and improve efficiency. Among different types of resonant converters, LLC resonant converters are frequently used in various applications, such as battery chargers, LED drivers, and fuel cell and solar panel energy systems. There are four different topologies for LLC resonant converters. The most popular LLC converter is the half bridge LLC converter 10, and it is shown in FIG. 1.

Although the half bridge LLC converter is able to provide soft switching conditions for the inverter switches (14 and 18 in FIG. 1) and rectifier diodes, including zero voltage and zero current switching (ZVS and ZCS) conditions, the complexity of its analysis and conductive losses in the rectifier have remained a barrier to gaining high efficiencies, especially in low-voltage-high-current applications. The use of synchronous rectifiers (SRs) (42 and 46 in FIG. 1) has been widely addressed in literature as a means to tackle the reduced efficiency and high conductive losses caused by the forward voltage of the rectifier diodes. The main challenge in using SRs with LLC converters is determining their conduction angles, which is often performed using high current or noisy voltage measurements.

One of the earliest methods introduced to drive SRs in LLC converters was current driven synchronous rectification. The method is applicable in most power electronic topologies, including the half bridge LLC converter as in FIG. 1. The method takes advantage of series-connected current transformers (CTs) with the SRs in order to detect the current polarity. Positive and negative currents force the CT to turn the SRs on and off, respectively. The time delay and the effect of the CT's leakage and magnetizing inductors should be considered when using CTs in high-switching-frequency applications. A modified version of current driven synchronous rectification can be used to drive the SRs in an LLC resonant converter that has a voltage doubler rectifier. A CT with only a secondary winding is used to drive the SRs in the voltage doubler rectifier. However, using the CTs on the secondary side of the transformer can be very dissipative, since the secondary current is relatively large in applications where the SRs are used. In order to reduce the conduction losses when the current driven synchronous rectification method is used, the CT can be installed on the primary side of the transformer. The primary current includes the reflected current from the transformer's secondary to primary and magnetizing current. In order to detect the zero crossing points of the secondary current, a current compensating winding can be used to cancel the effect of the magnetizing current.

The magnitude of the voltage drop across the drain-to-source of the SRs 42 and 46 can be sensed as an alternative method of detecting their conduction angles. Smart synchronous rectifier driver integrated circuits (ICs) were introduced almost two decades ago in order to provide proper sensing and timing control circuits and drive the SRs. Some challenges that must be addressed when using smart SR driver ICs are the predefined threshold voltage levels, minimum on time (MOT), the effect of temperature on the IC's parameters, and the effects of the stray inductance and loading conditions. The very small voltage drop over the drain-to-source of the SRs or their body diode when conducting is greatly affected by noise making it difficult to detect the zero crossing point. In many cases, it is necessary to use zero crossing noise filters when using the drain-to-source voltage to detect the conduction angles of the SRs. If the effect of the stray inductances of the SRs are not compensated, the detection of the conduction angles cannot be optimized. A predictive gate drive method can be used to compensate the effect of the stray inductance and provide a more stable driving signal for the SRs. The SRs in half bridge LLC converters can also be driven using an adaptive control method, assuming that the start of the conduction angles of the SRs coincides with the rising edge of the inverter voltage (24 in FIG. 1). In that adaptive control method, the turn-off instants of the SRs are digitally tuned based on the corresponding voltage drop. However, when operating above resonance, the adaptive control method suffers from a lack of coincidence between the start of the conduction angles of the SRs and the rising edge of the inverter voltage.

It is an object of this invention to propose an improved SR timing control approach that is relatively immune to noise, in SR-LLC converters. It is another object of this invention to maximize the range of synchronous rectification coverage from light to full loading conditions. It is also an object of this invention to provide safe operation for LLC converters with synchronous rectifiers during transients including start-up, load step-up and down, and short circuit conditions.

These and other objects will be better understood by reference to this application as a whole. Not all of the objects are necessarily met by all embodiments of the invention described below or by the invention defined by each of the claims.

SUMMARY OF THE INVENTION

Pursuant to embodiments of the present invention, synchronous rectification methods and topologies, use polarity sensing techniques based on a homopolarity concept to reduce conduction losses in LLC resonant converters, reduce the need for costly current sensors and SR low voltage sensing, which is subject to noise. The synchronous rectification for LLC converters disclosed herein includes a topology and a method based on the homopolarity condition, resulting in improved performance and reduced implementation cost.

"Homopolarity" refers to the condition in which the polarity of the inverter voltage applied to the resonant tank is the same as the polarity of the rectifier voltage, as measured across the secondary of the transformer. The present invention provides a topology and method for driving the synchronous rectifiers of LLC converters as a function of the homopolarity condition, leading to reduced conduction losses on the secondary side.

According to the invention, one of the SRs is switched ON when the polarity of the inverter voltage applied to the resonant tank and of the rectifier voltage are both positive and the other SR is switched ON when those polarities are both negative. This invention can be applied to any type of LLC converters including the LLC converter with the full or half bridge inverter and with the center tap, full bridge, or voltage doubler rectifier.

To prevent false triggering by transients in synchronous rectification, especially while operating below resonance, two monostables along with a transient detector may be used.

To account for the short circuit condition which may also interfere with the detection of homopolarity, the gate driving signals of the synchronous rectifiers are phase shifted against the gate driving signals of the inverter switches when such condition is detected to force the operation of the rectifier switches according to the known short circuit behavior of the LLC.

The invention can be implemented by discrete circuits or as an algorithm in any type of programmable integrated circuits (ICs) such as microcontrollers, FPGAs, CPLDs, etc.

In one aspect, the invention is a method of controlling rectification in an LLC DC-DC synchronous converter. The method comprises sensing a first signal representative of a voltage on an inverter side of the converter and sensing a second signal representative of a voltage on the rectifier side of the converter. The polarity of the first signal is compared with the polarity of the second signal. First and second switches on the rectifier side of the converter are controlled by turning the first switch ON and the second switch OFF while the first and second signals have positive polarities, turning the first switch OFF and the second switch ON while the first and second signals have negative polarities and otherwise turning the first and second switches OFF. The first signal of the method may be a gate drive signal to a switch on an inverter side of the rectifier.

An interval of time may be determined beginning at a turn ON of an inverter switch of the converter and lasting for approximately one half of a resonant period of the resonant tank of the converter, and the step of turning the first switch ON and the second switch OFF as well as the step of turning first switch OFF and the second switch ON may only performed during that time interval. The interval may be implemented using a monostable multivibrator.

The method may further comprise detecting whether a short circuit condition exists at the converter output and if so, overriding the step of controlling at least first and second switches on a rectifier side of the converter so as to instead operate the first and second switches with drive signals that are 90° phase lagged in relation to a voltage on an inverter side of the rectifier.

The method may further comprise detecting whether a transient is present in the converter and if so overriding the step of controlling at least first and second switches on a rectifier side of the converter and instead turning the first and second switches OFF during the transient.

The method may further comprise detecting whether a short circuit condition exists at the converter output and if so, overriding the step of controlling at least first and second switches on a rectifier side of the converter and instead operating them with drive signals that are 90° phase lagged in relation to a voltage on an inverter side of the rectifier, in addition to detecting whether a transient is present in the converter and if so, overriding the step of controlling at least first and second switches on a rectifier side of the converter and overriding the first step of this claim, and turning OFF said first and second switches during the presence of the transient.

The voltage on an inverter side of the converter that is being assessed according to the method may be a voltage applied to a resonant tank of the converter, and the voltage on the rectifier side of the converter that is being assessed according to the method may be a voltage across a secondary of a transformer of the converter.

The step of controlling at least first and second switches may be implemented by a combinational logic circuit comprising at least an AND gate having as inputs at least a gate drive signal for an inverter and a signal output from a comparator measuring a voltage across a secondary of the transformer.

In another aspect, the invention is a synchronous rectifier control system for an LLC DC/DC converter comprising a first signal representing a voltage on a rectifier side of the converter, a second signal whose polarity is representative of the polarity of a voltage applied to the resonant tank discounting any DC bias, a third signal that is phase shifted by 90° in relation to the second signal and a combinational logic circuit for determining whether polarities of the first and second signals are positive and in such case producing a drive signal capable of turning ON a first rectifier switch while turning OFF a second rectifier switch. The first signal may be a voltage across a secondary winding of the transformer. The second signal may be a primary inverter control signal. The combinational logic circuit may comprise at least one comparator operating on the first signal to determine its polarity.

The control system may further comprise a fourth signal that is active beginning at a turn ON of an inverter switch and lasting for approximately one half of a resonant period of the resonant tank, the fourth signal being an input to the combinational logic circuit. The combinational logic circuit operates to enable the drive signal to turn ON the first switch while turning OFF the second switch only while the fourth signal is active. The fourth signal may be generated by a monostable multivibrator.

There may be a fifth signal representative of a short circuit condition at an output of the converter and wherein, in response to the fifth signal, the combinational logic circuit enables the third signal to drive the first switch. The fifth signal may be supplied by a microcontroller.

There may be provided a transient detector producing a sixth signal when a transient is detected, and wherein the combinational logic circuit, in response to the sixth signal, overrides producing a drive signal when polarities of the first and second signals are positive and controls at least first and second switches on a rectifier side of the converter and turns the first and second switches OFF during the presence of the sixth signal.

The control system may comprise a fifth signal representative of a short circuit condition at an output of the converter and wherein, in response to the fifth signal, the combinational logic circuit enables the third signal to drive the first switch, as well as a transient detector producing a sixth signal when a transient is detected, and wherein the combinational logic circuit, in response to the sixth signal, overrides producing a drive signal when polarities of the first and second signals are positive and controls at least first and second switches on a rectifier side of the converter and turns the first and second switches OFF during the presence of the sixth signal.

In another aspect the invention is a method of generating two control signals for a synchronous rectifier for an LLC DC/DC converter comprising providing a first signal representing the converter's rectifier voltage, providing a second signal representing the converter's primary inverter voltage, providing a third signal representing the converter's primary inverter voltage phase shifted by 90 degrees and providing a fourth signal indicating the converter is in steady-state. A first control signal is generated by determining a positive polarity of the primary inverter voltage and a positive polarity of the rectifier voltage wherein the positive rectifier voltage polarity has a non-zero threshold, triggering at least one fixed time signal based on the rising edge of the primary inverter voltage polarity, applying a logical AND operation on the positive primary inverter voltage polarity, the fixed time signal, and the positive rectifier voltage polarity to generate the first nominal control signal, applying a logical AND operation on the positive phase-shifted primary inverter voltage and the inverted positive rectifier voltage polarity to generate a signal which is then operated on using a logical OR operation with the first nominal control signal to generate the first steady-state control signal and applying a logical AND operation to the first steady-state control signal and the signal indicating the converter is in steady-state the output of this operation is the first synchronous rectifier control signal. A second control signal is generated by determining the negative polarity of the primary inverter voltage and the negative polarity of the rectifier voltage wherein the negative rectifier voltage polarity has a non-zero threshold, triggering at least one fixed time signal based on the rising edge of the negative primary inverter voltage polarity, applying the logical AND operation on the negative primary inverter voltage polarity, the fixed time signal, and the negative rectifier voltage polarity to generate the second nominal control signal, applying the logical AND operation on the negative phase-shifted primary inverter voltage and the inverted negative rectifier voltage polarity to generate a signal which is then operated on using a logical OR operation with the second nominal control signal to generate the second steady-state control signal and applying the logical AND operation to the second steady-state control signal and the signal indicating the converter is in steady-state, the output of this operation is the second synchronous rectifier control signal.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which.

DETAILED DESCRIPTION OF THE PREFERRED AND ALTERNATIVE EMBODIMENTS AND OF THE BEST MODE

The topology and method will now be described with reference to a particular LLC converter, namely the half-bridge center-tapped LLC converter detailed in FIG. 1 and that is embodied in the preferred embodiment illustrated in FIG. 2. Note that this topology and method is not limited to the half-bridge center-tapped LLC converter and in fact may be applied to the half-bridge, half-bridge split resonant capacitor, full-bridge or multi-level LLC converter with center-tapped, or full-bridge synchronous rectification.

Figure 2:
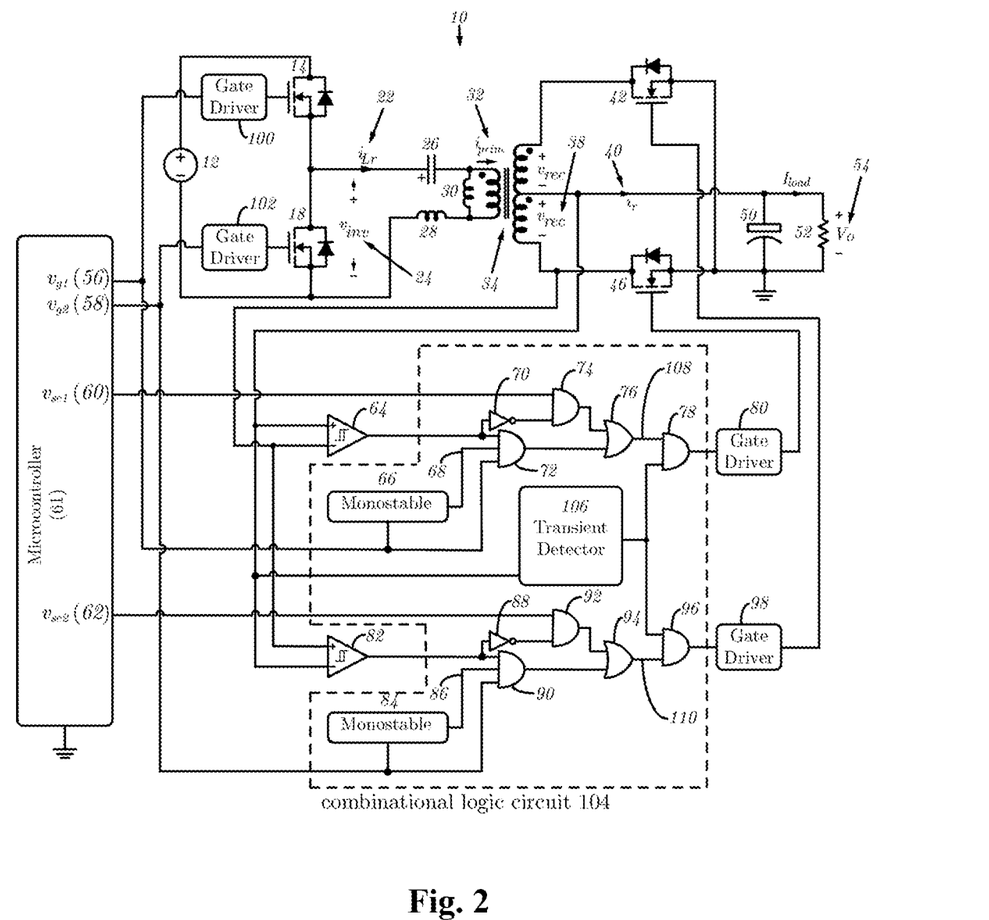
FIG. 2 is a circuit of the discrete implementation of the preferred embodiment of the invention.

In the LLC converter of FIG. 2, an input DC bus voltage 12 is applied across two primary switches 14 and 18 arranged in a totem pole configuration which are switched with an approximately 50% duty cycle with a small dead-time inserted to prevent cross-conduction. The resulting inverter voltage applied to the resonant tank (consisting of the series inductor 28, capacitor 26, and parallel inductor 30) consists of primarily a square wave of 50% duty cycle with a peak voltage equal to the input DC bus voltage. Due to the effect of the resonant tank this results in an approximately sinusoidal current 32 which flows through the primary side of the transformer 34 resulting in an approximately sinusoidal current in the secondary side. This secondary side current will have a variable phase shift from the voltage applied to the resonant tank due to the resonant elements; the phase shift changes with load conditions. This application provides an approach for detecting what the proper conduction interval for the synchronous rectifier should be (when to turn the rectifier switches 42 and 46 ON).

According to the invention, switch 42 is driven OFF and switch 46 is driven ON when the voltage applied to the resonant tank by the inverter (neglecting or subtracting any DC bias), hereafter referred to as the "inverter voltage applied to the resonant tank", and the voltage across the secondary of the transformer are both positive, and switch 42 is driven ON and switch 46 is driven OFF when those voltages are both negative. Otherwise, both switches are OFF. Table 1 illustrates such actuation of the rectifier switches according to the homopolarity condition.

TABLE 1

| Vinv 24 | Vrec 38 | Switch 46 | Switch 42 |
| --- | --- | --- | --- |
| + | + | ON | OFF |
| + | − | OFF | OFF |
| − | − | OFF | ON |
| − | + | OFF | OFF |

The polarity comparison is performed using (principally) an AND gate in a combinational logic circuit. The logic circuit also incorporates other features of the invention, including short circuit operation, operation during transients and masking the detection of homopolarity during ringing when the converter operates at or below resonance.

Inverter Voltage Polarity

While the polarity of the inverter voltage 24 could conceivably be measured directly, according to the preferred embodiment, a signal representative of the inverter voltage is used instead, namely the gate drive signals $V_{G1}$ 56, $V_{G2}$ 58 for the inverter switches 14 and 18, as described below. An advantage of this approach is that a direct measure of the absolute polarity of the inverter voltage might be rendered more difficult by any DC bias that is present, for example in a half bridge inverter. By using the gate drive signals the effect of any DC bias in the voltage that is actually applied to the resonant tank is ignored.

Rectifier Voltage Polarity

The voltage Vrec 38 across a secondary winding of the transformer (in this case the winding extending between the switch 42 and the center tap of the transformer 34) is sensed and applied to two comparators 64 and 82 in order to determine its polarity. The comparators can be used without any additional offset voltage; however, it is advantageous to add an offset voltage to improve noise immunity. The comparators could be constructed using discrete transistors, op-amps, digital comparator, or a programmable logic CPLD/FPGA. The comparator output signals 68, 86 are fed to respective AND gates 72, 90 of a combinational logic circuit 104.

It will be appreciated that the operation of the AND gates 72, 90 is such that their outputs can be high only when, in the case of AND gate 72, the polarities of both Vinv 24 (as detected by reference to the state of drive signal $V_{G1}$ 56 and Vrec 38 (as determined by the comparator 64) are positive, and in the case of AND gate 90, the polarities of both Vinv 24 and Vrec 38 are negative.

Accommodating Short Circuits, Transients and Operation Below Resonance

Combinational logic circuit 104 also processes other special case signals which will now be described.

When the half bridge LLC converter 10 operates below and at resonance the period of time during which the polarity of the inverter voltage 24 is the same as the rectifier voltage 38, is shorter than half a switching period. This results in a period of time when no current flows in the synchronous rectifier switches, which leads to ringing of the transformer secondary voltage triggered by the turn off of the switches. The ringing is due to the stray inductances and parasitic capacitors. This ringing may lead to the detection of polarity coincidences with the inverter voltage, leading to incorrect operation of the synchronous rectifier switches 42 and 46. Two monostable multivibrators 66 and 84 can be used to resolve the above case and to mask the comparator output during ringing below and at resonance. Monostable 66 is activated by $V_{G1}$ 56 which drives the inverter voltage. The output of the monostable 66 is combined with the output of the comparator 64 through a logical AND operation 72. Therefore when the monostable has expired and its output goes low, the output of comparator 64 is prevented from triggering AND gate 72 to go high and to trigger the rectifier switch 46. Below and at resonance, when the rising edges of the gate-to-source voltage of the inverter switch 14 happens, the polarity of the rectifier voltage 38 becomes positive. The monostable time is set as half the resonant period of the resonant tank. At the beginning of the first half cycle, below resonance, the gate-to-source voltage of the inverter switch 14 becomes high and monostable 66 is triggered. At the same time the polarity of the rectifier voltage 38 becomes positive. Therefore, the SR 46 is turned on. Once the monostable 66 is expired, its output signal becomes zero, and therefore, the SR 46 is turned off. In the second half cycle, the same procedure occurs for the SR 42 and monostable 84 being triggered by $V_{G2}$ 58 to mask ringing.

The output of AND gate 72 therefore goes high only when the polarity of Vinv 24 and the polarity of Vrec 38 are both positive and monostable 66 has not expired, such that if operating at or below resonance, homopolarity cannot be "detected" during the period when ringing might be present. Conversely, AND gate 90 goes high only when the polarity of Vinv 24 and Vrec 38 are both negative and monostable 84 has not expired.

In order to ensure proper operation during short circuit, an additional control feature is implemented. During short circuit the voltage at the secondary winding of the transformer will be very small due to the low impedance nature of the short circuit; thus causing problems for the comparator which due to the low voltages involved may be unable to accurately assess the polarity of Vrec. To obviate this, a microcontroller 61 is used to detect a short circuit condition at Vo at which time the microcontroller output produces a PWM drive signal $V_{SC1}$ 60 that is approximately 90° phase-lagged from the primary inverter voltage Vinv 24 This represents the conduction period of the synchronous rectifier during short circuit which is well known by those skilled in the art. The drive signal is used during a short circuit to drive the switches 42, 46 ON when their respective body diodes are conducting, which will be 90° out of phase from the inverter voltage 24. Drive signal Vsc1 60 is combined with the inverted (70) Vrec polarity signal at an AND gate 74 so that this PWM signal is only allowed to pass during short circuit (when the Vrec signal polarity is 'low'). This short circuit signal is then OR'ed 76 with the normal operation synchronous rectifier control signal to generate a signal 108. The same approach is taken for the other switch and signal 110.

The combinational logic circuit described above therefore accounts for both the detection of homopolarity, masks the effects of ringing at and below resonance and overcomes the problem posed by the short circuit condition. The invention also accommodates transients, which will now be discussed.

During transients the frequency and phase of the currents in the converter can change rapidly and unpredictably causing glitches in control signals 108 and 110. Therefore, in order to prevent cross conduction and failures, signals 108 and 110 are gated through AND operations 78 and 96 with a signal generated by a transient detector circuit 106, which goes low during transients. The output of this operation is then applied directly or through a gate driver to the synchronous rectifier such that during transients both of the rectifier switches are OFF. The transient detector circuit can be implemented in multiple ways, it could be a passive or active high pass filter applied to the converter output voltage or current, or a signal generated by a microcontroller or programmable logic element such as a CPLD or FPGA which detects changes in voltage, current, or frequency. Likewise, the digital logic detailed above could also be constructed using transistors, discrete digital logic, or some form of programmable logic (CPLD, FPGA, microcontroller).

The description above applies for the control of the first synchronous rectifier switch 46; to control the second rectifier switch 42 during short circuits and transients the same approach is used. Additionally, the correct corresponding primary voltage signal must be used ($V_{G2}$ 58 and $V_{SC2}$ 62 instead of $V_{G1}$ 56 and $V_{SC1}$ 60). The same transient detector may be used to control both synchronous rectifiers, however, it is possible to have a plurality of transient detectors. Similarly different means of detecting a short circuit may also be used.

Figure 3:
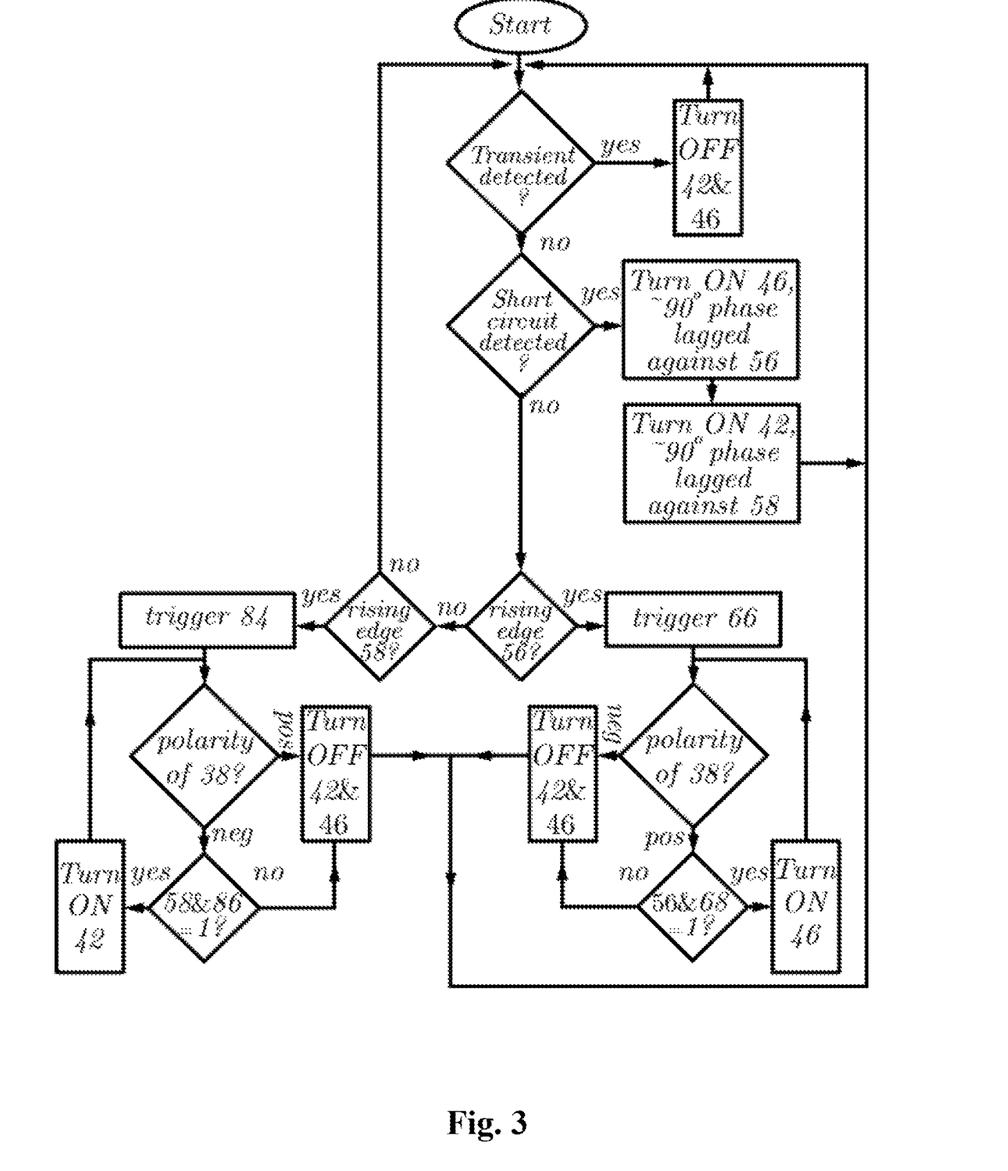
FIG. 3 is a flowchart of the algorithm implemented in the preferred embodiment.

The synchronous rectifier control method can also be characterized by an algorithm as exemplified in FIG. 3. In this method if a transient is detected by the transient detector 106 then the gate signals 80, 82 going to the synchronous rectifiers 42, 46 are disabled. If the converter is in short circuit then synchronous rectifier 46 is controlled by a signal which is a phase lagged by approximately 90° version of the primary inverter voltage (gate signal of 56) and the synchronous rectifier 42 is controlled by a signal which is the logic inversion of the primary inverter voltage (gate signal of 58). Otherwise, in steady-state, normal operation when a rising edge is detected in either $V_{G1}$ 56 or $V_{G2}$ 58 then a monostable timer is triggered which corresponds to half the resonant period. The polarity of the secondary winding voltage is then checked; if the polarity is positive and the corresponding monostable timer (66) is active then the synchronous rectifier 46 is turned ON; if the polarity is negative and the output of the corresponding monostable timer (84) is active then the synchronous rectifier 42 is turned ON. As soon as any of the above conditions for the corresponding synchronous rectifiers is no longer present the synchronous rectifier is turned off.

The LLC converter 10, shown in FIG. 2 can operate below, at and above resonance.

The method of the invention is also able to control the SRs in transients, including the start-up, short-circuit, input voltage change, and load step-up and down. As shown in FIG. 2, the discrete circuit has a transient detector circuit 106. The aim of using the transient detector circuit 106 is to find whether the half bridge LLC converter 10 is operating in the steady-state or not. If it is detected that the half bridge LLC converter 10 is operating in the steady-state, the SRs 42 and 46 are controlled as usual; however if a transient is detected, the SRs 42 and 46 are turned off as long as the transient condition is not resolved. Under the short circuit condition, the invented method is still able to control the SRs 42 and 46. In order to limit the output current, under the short circuit condition, the switching frequency of the half bridge LLC converter 10 is set at maximum. Since under the short circuit condition, the output voltage is very close to zero, the gate driving signals of the inverter switches 14 and 18, and those of the SRs 42 and 46 are phase shifted by approximately 90 degrees.

Figure 4:
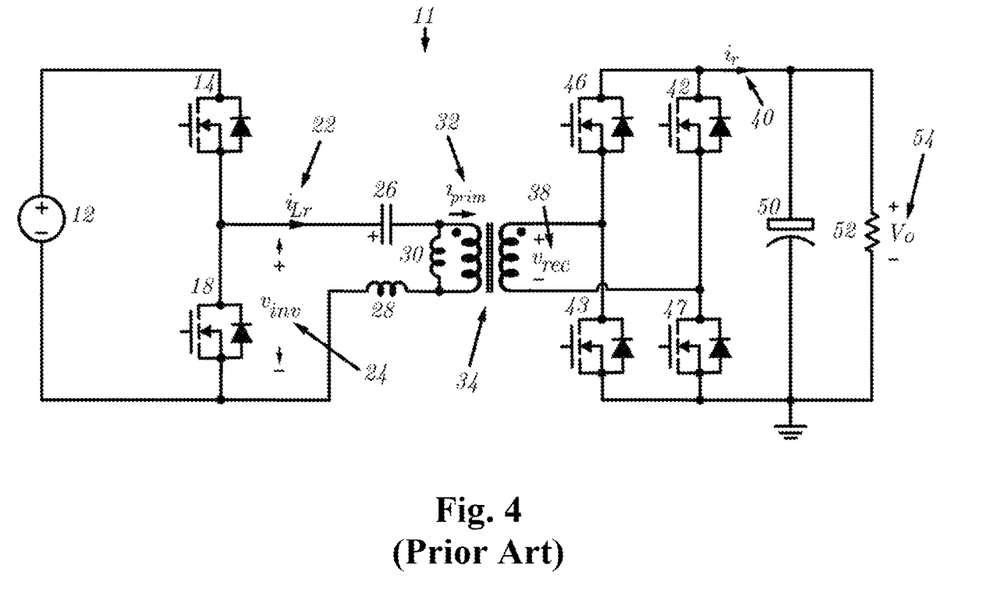
FIG. 4 is a circuit diagram of a prior art half bridge converter with full bridge rectifier showing the inverter input voltage to the resonant tank.
Figure 5:
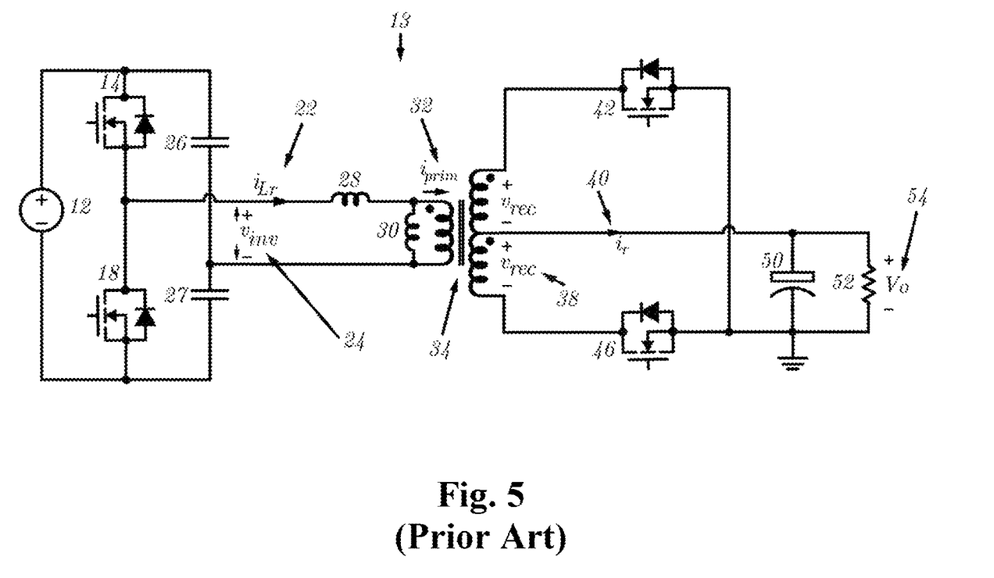
FIG. 5 is a circuit diagram of a prior art half bridge split capacitance converter with center tap rectifier showing the inverter input voltage to the resonant tank; and, FIG. 6 is a circuit diagram of a prior art converter with full bridge inverter stage.
Figure 6:
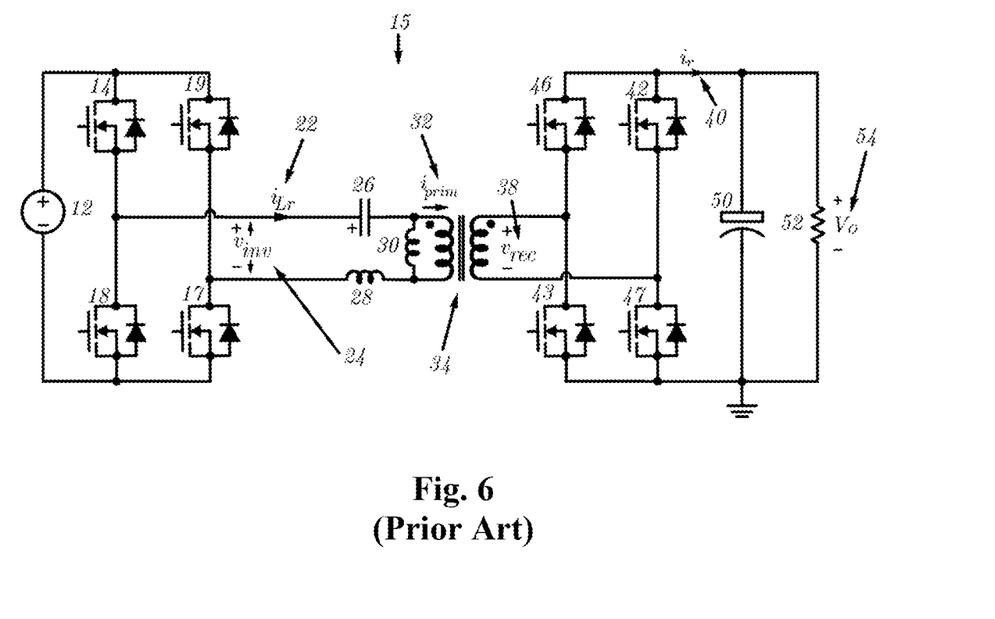

The approaches of the invention can be equally applied to a full bridge rectifier stage as illustrated in FIG. 4, to a split capacitance stage as illustrated in FIG. 5 and to a full bridge inverter stage as illustrated in FIG. 6 or any combination thereof. In each case the inverter side voltage whose polarity is preferably evaluated is the inverter voltage applied to the input of the resonant tank and the rectifier side voltage whose polarity it is compared to is preferably the voltage across the secondary winding of the transformer. As suggested by our earlier discussion, those polarities can be inferred by other signals that are representative of them, such as for example the gate drive signal driving an appropriate inverter switch.

It will be appreciated that the combinational logic circuit described in the preferred embodiment may be implemented in alternate ways to achieve the same control scheme for controlling the rectifier switches. For example other logic gates may be used rather than those of the embodiment with appropriate inversions and the appropriate selection of the sense of the voltages and signals being used as inputs.

It will also be appreciated that the signals used in the control scheme of the invention may be derived by measuring and scaling the appropriate voltages, for example by voltage dividers, active filters or other means.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A method of controlling rectification in an LLC DC-DC synchronous converter, comprising:
    sensing a first signal representative of a voltage on an inverter side of the converter;
    sensing a second signal representative of a voltage on a rectifier side of the converter;
    comparing a polarity of the first signal with a polarity of the second signal;
    controlling at least first and second switches on the rectifier side of the converter by:
        turning the first switch ON and the second switch OFF while the first and second signals have positive polarities;
        turning the first switch OFF and the second switch ON while the first and second signals have negative polarities; and,
        otherwise turning the first and second switches OFF.

2. The method of claim 1 wherein there is an interval beginning at a turn ON of an inverter switch of said converter and lasting for approximately one half of a resonant period of a resonant tank of said converter, and wherein said turning the first switch ON and the second switch OFF and said turning the first switch OFF and the second switch ON are only performed during said interval.

3. The method of claim 1 further comprising:
    detecting whether a short circuit condition exists at a converter output;
    in response to detecting said short circuit condition, overriding said controlling the at least first and second switches on the rectifier side of the converter and operating said first and second switches with drive signals that are 90° phase lagged in relation to a voltage on an inverter side of a rectifier.

4. The method of claim 1 further comprising:
    detecting whether a transient is present in the converter; and,
    in response to detecting said transient, overriding said controlling the at least first and second switches on the rectifier side of the converter and turning said first and second switches OFF during the presence of said transient.

5. The method of claim 2 further comprising:
    detecting whether a short circuit condition exists at a converter output and in response to detecting said short circuit condition, overriding said controlling the at least first and second switches on the rectifier side of the converter and operating said first and second switches with drive signals that are 90° phase lagged in relation to a voltage on an inverter side of a rectifier; and,
    detecting whether a transient is present in the converter and in response to detecting said transient, overriding said controlling the at least first and second switches on the rectifier side of the converter and overriding the detecting of whether the short circuit condition exists at the converter output, and turning OFF said first and second switches during the presence of said transient.

6. The method of claim 1 wherein said voltage on the inverter side of the converter is a voltage applied to a resonant tank of said converter.

7. The method of claim 1 wherein a voltage on the rectifier side of the converter is a voltage across a secondary of a transformer of said converter.

8. The method of claim 1 or 6 wherein said first signal is a gate drive signal to a third switch on an inverter side of said rectifier.

9. The method of claim 2 wherein said interval is implemented by a circuit comprising a monostable multivibrator.

10. The method of claim 1 wherein said controlling the at least first and second switches is implemented by a combinational logic circuit comprising at least an AND gate having as inputs at least a gate drive signal for a third switch on an inverter side of a rectifier and a signal output from a comparator measuring a voltage across a secondary of a transformer of said converter.

11. A synchronous rectifier control system for an LLC DC/DC converter comprising:
    a first signal representing a voltage on a rectifier side of said converter;
    a second signal whose polarity is representative of a polarity of a voltage applied to a resonant tank of said converter discounting any DC bias;
    a third signal that is phase shifted by 90° in relation to said second signal; and,
    a combinational logic circuit for determining whether polarities of said first and second signals are positive and in such case producing a drive signal capable of turning ON a first switch on the rectifier side of said converter while turning OFF a second switch on the rectifier side of said converter.

12. The control system of claim 11 further comprising:
    a fourth signal that is active beginning at a turn ON of an inverter switch of said converter and lasting for approximately one half of a resonant period of a resonant tank of said converter, said fourth signal being an input to said combinational logic circuit; and,
    wherein said combinational logic circuit operates to enable said drive signal to turn ON said first switch while turning OFF said second switch only while said fourth signal is active.

13. The control system of claim 12 wherein said fourth signal is generated by a monostable multivibrator.

14. The control system of claim 11 further comprising a fifth signal representative of a short circuit condition at an output of said converter and wherein, in response to said fifth signal, said combinational logic circuit enables said third signal to drive said first switch.

15. The control system of claim 14 wherein said fifth signal is supplied by a microcontroller.

16. The control system of claim 11 further comprising a transient detector producing a sixth signal when a transient is detected, and wherein said combinational logic circuit, in response to said sixth signal, overrides producing the drive signal when polarities of said first and second signals are positive and controls at least first and second switches on the rectifier side of the converter and turns said first and second switches OFF during a presence of said sixth signal.

17. The control system of claim 12 further comprising a fifth signal representative of a short circuit condition at an output of said converter and wherein, in response to said fifth signal, said combinational logic circuit enables said third signal to drive said first switch, and a transient detector producing a sixth signal when a transient is detected, and wherein said combinational logic circuit, in response to said sixth signal, overrides producing the drive signal when polarities of said first and second signals are positive and controls at least first and second switches on the rectifier side of the converter and turns said first and second switches OFF during a presence of said sixth signal.

18. The control system of claim 11 wherein said first signal is a voltage across a secondary winding of a transformer of said converter.

19. The control system of claim 18 wherein said second signal is a primary inverter control signal.

20. The control system of claim 11 wherein said combinational logic circuit comprises at least one comparator operating on said first signal to determine its polarity.

21. A method of generating two control signals for a synchronous rectifier for an LLC DC/DC converter comprising:
    providing a first signal representing a rectifier voltage of the converter;
    providing a second signal representing a primary inverter voltage of the converter;
    providing a third signal representing the primary inverter voltage of the converter phase shifted by 90 degrees,
    providing a fourth signal indicating the converter is in steady-state;
    generating a first synchronous rectifier control signal by:
        determining a positive polarity of the primary inverter voltage and a positive polarity of the rectifier voltage wherein the positive polarity of the rectifier voltage has a non-zero threshold;
        triggering at least one first fixed time signal based on a rising edge of the positive primary inverter voltage polarity;
        applying a logical AND operation on the positive polarity of the primary inverter voltage, the fixed time signal, and the positive polarity of the rectifier voltage to generate a first nominal control signal;
        applying a logical AND operation on the positive polarity of the primary inverter voltage of the converter, phase-shifted by 90 degrees, and an inverted positive polarity of the rectifier voltage to generate a first intermediate signal which is then operated on using a logical OR operation with the first nominal control signal to generate a first steady-state control signal;
        applying a logical AND operation to the first steady-state control signal and the fourth signal indicating the converter is in steady-state to provide the first synchronous rectifier control signal;
    generating a second synchronous rectifier control signal by:
        determining a negative polarity of the primary inverter voltage and a negative polarity of the rectifier voltage, wherein the negative polarity of the rectifier voltage has a non-zero threshold,
        triggering at least one second fixed time signal based on a rising edge of the negative primary inverter voltage polarity,
        applying the logical AND operation on the negative polarity of the primary inverter voltage, the at least one fixed time signal, and the negative polarity of the rectifier voltage to generate a second nominal control signal;
        applying the logical AND operation on the negative polarity of the primary inverter voltage of the converter, phase-shifted by 90 degrees, and an inverted negative polarity of the rectifier voltage to generate a second intermediate signal which is then operated on using a logical OR operation with the second nominal control signal to generate a second steady-state control signal,
        applying the logical AND operation to the second steady-state control signal and the fourth signal indicating the converter is in steady-state, to provide the second synchronous rectifier control signal.

* * * * *